March 24, 1959   C. B. KEYES ET AL   2,878,923
CONVEYOR TRAY ASSEMBLY
Filed Dec. 9, 1955   2 Sheets-Sheet 1
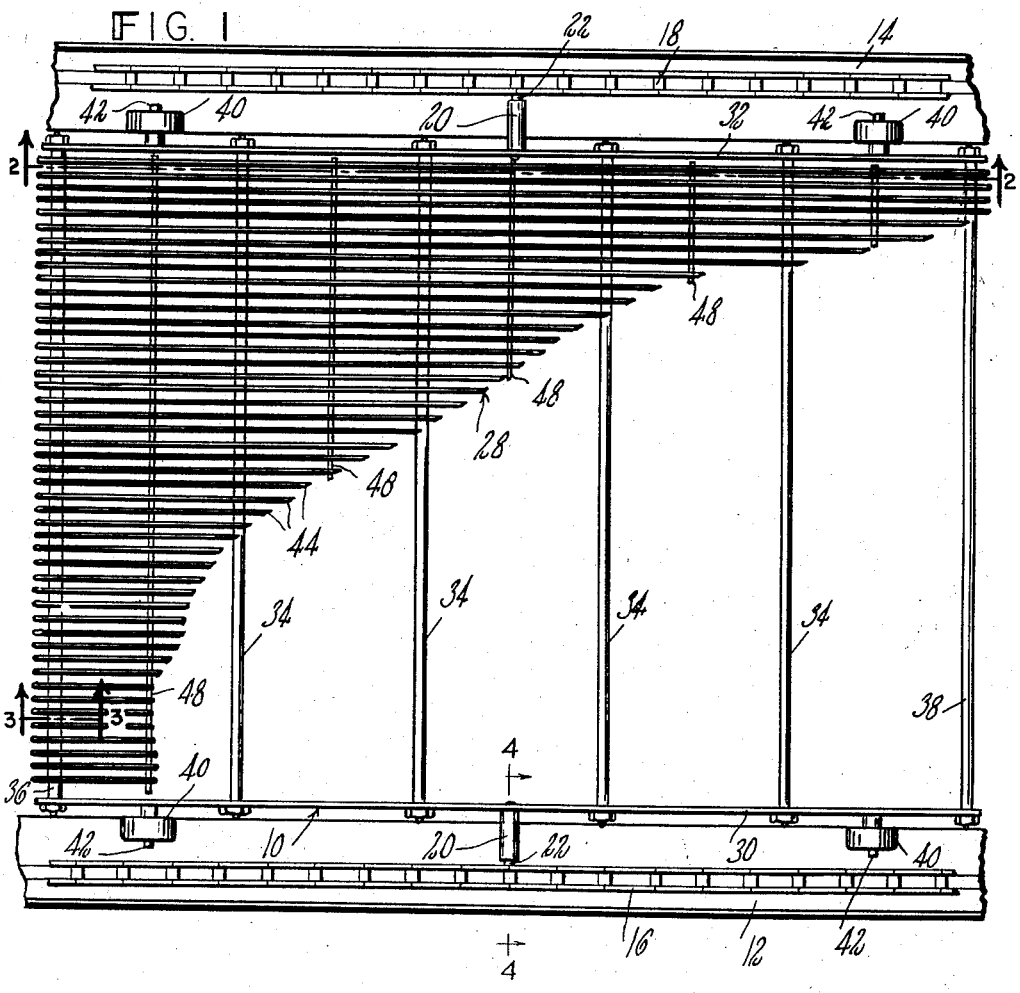
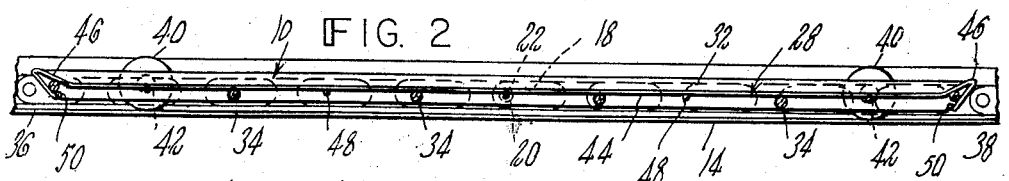
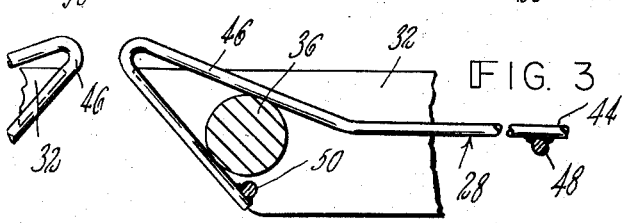
INVENTORS
Clifford B. Keyes
William Hill
by Maxwell Fish
ATTY.

March 24, 1959 C. B. KEYES ET AL 2,878,923
CONVEYOR TRAY ASSEMBLY
Filed Dec. 9, 1955 2 Sheets-Sheet 2

INVENTORS
Clifford B. Keyes
William Hill
by Maxwell Fish
ATTY.

2,878,923

CONVEYOR TRAY ASSEMBLY

Clifford B. Keyes, Arlington, and William Hill, Belmont, Mass., assignors to J. W. Greer Company, Wilmington, Del., a corporation of Massachusetts Application December 9, 1955, Serial No. 552,012

3 Claims. (Cl. 198—158)

The present invention relates to a conveyor tray assembly and more particularly to a detachable tray for use in such an assembly.

The invention is herein disclosed as embodied in a conveyor tray assembly of a general type suitable for use in food processing conveyor systems and the like having a series of chassis adapted to be carried between spaced parallel conveyor chains and to receive thereon trays of the general type having a flat supporting surface preferably in the form of a grid.

It is a principal object of the invention to provide an improved tray for use in a conveyor tray assembly which is constructed and arranged to cooperate in a novel and improved manner with adjacent trays of the series in a conveyor assembly to prevent even small products, loaded on the trays, from falling between trays as the trays are moved on the conveyor from one to another level.

More specifically, it is an object of the invention to provide a tray which may be combined with other similar trays in a series to permit continuous loading of the conveyor system without risk that even small products, lodged temporarily on the edges of adjacent trays, may be caught and damaged or lost between the trays, particularly during such times when they are moved vertically with relation to one another, as for example, from one to another level.

It is a further object of the invention to provide an improved tray having a grid construction, which is therefore well adapted for conveying a product which needs to be cooled, heated or dried as, for example, products which might be transported in a food processing conveyor system, which tray may be firmly secured in position on its chassis, and is readily detachable with a minimum of effort on the part of the operator.

With these and other objects in view as may hereinafter appear, a feature of the invention consists in the construction of the trays with upwardly inclined lips at each end of each tray, said lips being constructed and arranged so that when one of two adjacent lips of adjacent trays is moved above the other, the lip of the upper tray in the series tends to override the lip of the nether tray, thus causing any product, which might be balanced on the two lips to be transferred or tumbled to a safe position on the lower tray.

Another feature of the invention consists in the construction and arrangement of a tray comprising a series of parallel wires providing a grid of which the wires at each end are bent upwardly in an identical manner, and are then doubled downwardly sharply to a nearly parallel position so that an upwardly inclined lip of the sort above referred to is provided at each of the two opposite edges of the tray. The two lips thus formed are adapted to snap over two associated cross bars of the chassis to provide a spring-seated holding engagement of the tray with the cross bars of the chassis.

A typical embodiment of our invention is shown in the accompanying drawings, in which:

Fig. 1 is a plan view of a conveyor tray assembly including a chassis and a conveyor tray broken away to show underlying parts, together with the portions of the guideway and conveyor chains between which the trays and their supporting chassis are carried;

Fig. 2 is a plan view in side elevation of the tray assembly shown in Fig. 1;

Fig. 3 is an enlarged fragmentary sectional view taken on a line 3—3 of Fig. 1 to illustrate particularly the manner of securing the tray in position on the chassis;

Figure 5:
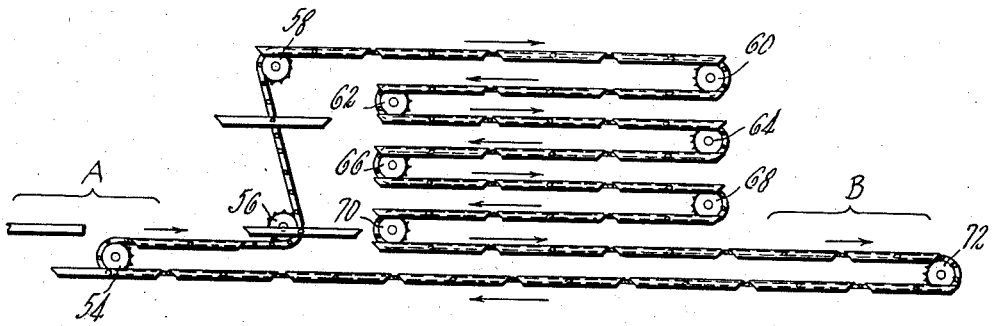
Figure 6:
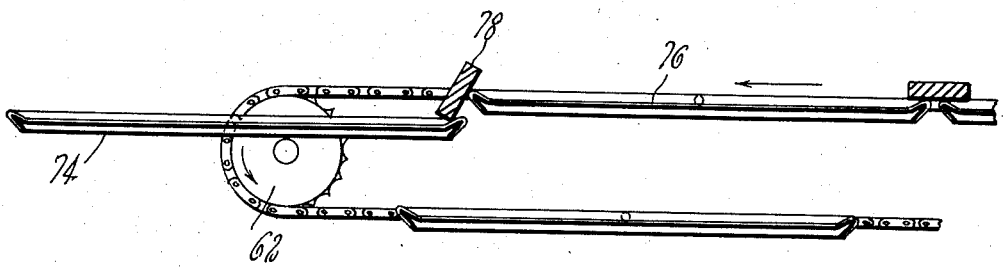

Fig. 5 is a diagrammatic view indicating the path over which the trays forming part of the conveyor assembly are required to travel including forward and back movements at successively lower levels; and Fig. 6 is an enlarged view illustrating the manner in which the lips of two adjacent trays cooperate as the trays move successively from one to another level to insure the transfer of any product which may be balanced on the two lips into a safe position on the lower of the two trays.

Figure 4:
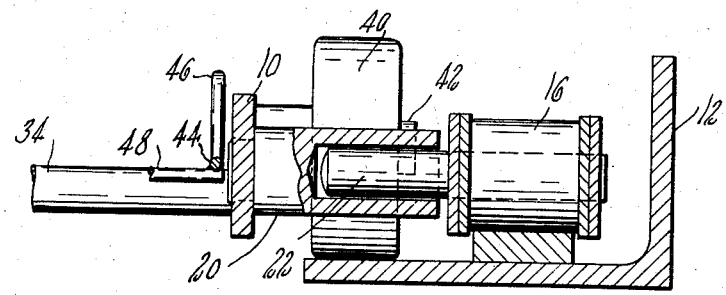
Fig. 4 is an enlarged detail sectional view showing the pivotal connection between the individual tray chassis and the conveyor chain to which it is connected.

Referring particularly to the drawings, the conveyor tray assembly shown comprises a series of chassis 10, one of which is shown in the drawings, a pair of guide rails 12 and 14 on which the chassis are supported, and a pair of conveyor chains 16 and 18 which may be of ordinary description. Each chassis 10 is pivotally connected at its mid point to the two roller conveyor chains 16 and 18. Each pivotal connection (see Fig. 4) consists of a stud 20 secured at one end to the chassis 10, and having its other end bored to receive an extended chain pin 22 of the associated roller conveyor chain. The chassis, in turn, has mounted thereon a detachable tray 28. The chassis generally indicated at 10 consists more specifically of two side plates 30, 32 and a series of connecting cross bars 34, spaced from one another to provide a supporting bed for the tray 28. The two cross bars, one at each end of the chassis indicated respectively at 36 and 38, are disposed at a slightly higher level than the remaining cross bars 34. Adjacent to each corner of the chassis there is provided a roller 40, which is mounted on a pivot pin 42 projecting from the side plates 30 and 32, said rollers 40 being adapted to ride on the guide rails 12 and 14.

In accordance with the present invention, the tray 28 comprises a series of parallel wires providing a grid, of which the wires 44 at each end of the grid are bent or sloped upwardly in an identical manner and the end portions thereof are then bent or folded sharply downwardly to a nearly parallel position with the sloping portions so that a raised lip 46 is provided at each of the two opposite edges of the tray. The wires 44 of the grid are fastened together by means of a series of parallel cross bars 48, which are spaced from one another along the under side of the grid. It will be noted that at each end of the grid the ends of the grid wires 44 are soldered to a cross member in the form of a small wire 50 which is mounted on the inner side of the lip.

The lips 46 at each end of the grid formed in the manner above described, are adapted to be sprung into locking engagement with the respective end cross bars 36 and 38, so that the tray is firmly and at the same time detachably held in position on the chassis.

The construction and arrangement of the trays with their upwardly sloping undercut lips is such that it is possible to mount the trays in the conveyor system in very close relation to one another so that the spacing between lips 46 of adjacent trays will normally be not more than ¼" apart. Specifically, the undercut or beveled construction at each end of the trays allows them to override one another without interference as they are moved from level to level, thus permitting continuous loading of even small products, so that such products will not fall between the trays as the trays go from level to level.

Fig. 5 illustrates in somewhat diagrammatic form a typical path through which the successive trays may pass back and forth from an assembly position, generally indicated at A to a packing table which is generally indicated at B. In this instance the tray conveyor chains and trays mounted thereon starting from a loading station A and sprocket 54 pass around a sprocket 56, and upwardly to a sprocket 58, whence the chains and the conveyor trays mounted thereon pass back and forth from one level to another around sprockets 60, 62, 64, 66, 68, and 70, and finally around sprocket 72 at the packing table whence they return to the starting point around sprocket 54.

Fig. 6 illustrates the manner in which the trays cooperate with one another in passing from one to another level as, for example, about the sprocket 62. It will be noted that, as the left hand tray, specifically designated at 74, moves downwardly about the sprocket 62, the following tray 76 gains on tray 74 causing a small product 78 balanced on the two adjacent lips to transfer or tumble onto the tray 74, thus avoiding any possibility that such a product might fall between the two trays. It will be understood that if the trays were going from a lower level to an upper level the same transfer or tumbling action would take place as the leading tray rises and the following tray tends to ride under or gain with relation thereto.

The tray assembly above described is a substantial improvement upon tray assemblies suitable for use in food processing conveyor systems and the like heretofore developed in that the tray is of light and at the same time rugged construction, tends to lock itself very firmly in position and is also very readily removable by the operator who has only to flex the lip portions thereof slightly to free the trays for removal. The locking effect produced by the conformation of the lip 46 is substantially aided by the position of the two small cross bars or wires 50, which engage beneath the associated cross bars 36 and 38 of the chassis and thus act as latch elements to hold the tray in position.

The invention having been described what is claimed is:

1. A conveyor tray assembly comprising a series of chassis, each consisting of a pair of parallel supporting members, and at least two cross rods extending therebetween in parallel relation, one at each end of the chassis, means for conveying the chassis of said series along a conveyor path in following relation, said path having horizontal components at different levels and a vertical component leading from one level to a different level, and a series of trays mounted on said chassis in closely adjacent relation, each tray comprising a series of parallel wires providing a grid, of which the wires at each end of the grid are bent to slope upwardly in an identical manner and the end portions thereof are then doubled sharply downwardly to a nearly parallel position with said sloping portions so that a raised lip with a beveled under edge is provided at each of the two opposite ends of the tray, permitting each following tray to overtake the preceding tray during movement of said trays successively to said different levels, and cross members securing together said parallel wires, said lips being further constructed and arranged to permit the inner sides of said doubled-over end portions to be brought into resilient locking engagement with said cross rods.

2. A conveyor tray assembly which comprises a chassis comprising a pair of parallel supporting members and cross rods extending therebetween in a parallel relation in a grid supporting plane, and a conveyor tray comprising a series of parallel wires providing a grid, of which the wires at each end of the grid are bent to slope upwardly in an identical manner and the end portions thereof are then doubled sharply downwardly to a nearly parallel position with said sloping portions so that a raised lip is provided at each of the two opposite edges of the tray, and cross members to which the wires are secured, spaced from one another along the length of the grid, one of said cross rods being provided at each end of the chassis, said end cross rods having a spacing from one another equal to the length of the grid, whereby the inner faces of the doubled-over end portions of the grid are brought into a resilient locking engagement with said end cross rods.

3. A conveyor tray assembly which comprises a pair of parallel supporting members having the ends thereof undercut and cross rods extending between said supporting members in parallel relation in a grid supporting plane and including adjacent each end of said spaced supporting members one of said cross rods located somewhat above the supporting plane provided by others of said cross rods, and a conveyor tray which comprises a series of parallel wires providing a grid, each of said wires being bent upwardly in an identical manner adjacent each end thereof to provide upwardly sloping lips at two opposed ends of the tray, said end portions of each wire being thereafter doubled sharply downwardly to a nearly parallel position with the upwardly sloping lip edge, cross members securing together said parallel wires including end cross members extending across both end portions of the several wires, said lips and the end cross members being constructed and arranged to cause said inner sides of said doubled-over end portions and end cross members secured thereto to be brought into a resilient locking engagement said end cross rods.

References Cited in the file of this patent

UNITED STATES PATENTS

| 847,147 | Arthur | Mar. 12, 1907 |

FOREIGN PATENTS

| 158,426 | Austria | Apr. 10, 1940 |